United States Patent [19]

Bernard et al.

[11] Patent Number: 5,075,000
[45] Date of Patent: Dec. 24, 1991

[54] FILTER PAD HOLDER

[75] Inventors: Richard A. Bernard, Kirkland; John G. Gardner, Woodinville, both of Wash.

[73] Assignee: Filtercorp, Inc., Bothell, Wash.

[21] Appl. No.: 527,566

[22] Filed: May 22, 1990

[51] Int. Cl.$^5$ .............................................. B01D 46/10
[52] U.S. Cl. .................................. 210/168; 210/416.5; 210/445; 210/484; 210/495; 55/493; 55/DIG. 31
[58] Field of Search ................. 55/DIG. 31, 493, 510, 55/511, 505; 210/168, 416.5, 445, 449, 232, 238, 453, 484, 485, 495

[56] References Cited

U.S. PATENT DOCUMENTS

| | | | |
|---|---|---|---|
| 3,280,984 | 10/1966 | Sexton et al. | 55/493 |
| 3,348,044 | 10/1967 | Sanders | 55/493 |
| 3,929,648 | 12/1975 | Cuthbert | 210/453 |
| 4,549,887 | 10/1985 | Joannou | 55/493 |
| 4,762,053 | 8/1988 | Wolfert | 55/493 |
| 4,801,316 | 1/1989 | Schroeder | 55/DIG. 31 |
| 4,828,694 | 5/1989 | Leason | 210/168 |

Primary Examiner—Robert A. Dawson
Assistant Examiner—Wanda L. Millard
Attorney, Agent, or Firm—Christensen, O'Connor, Johnson & Kindness

[57] ABSTRACT

An improved filter pad holder for supporting a filter pad and for use in conjunction with a filter system having a pumping unit to filter a contaminated fluid. The filter pad holder (10) includes a base frame (20) and an upper housing (22) hingedly coupled by a pair of spaced-apart hinges (24) to form a chamber (53) when pivoted to a closed operative position. When held in this closed operative position by a pair of spaced-apart latches (26), a pair of tapered ribs (32 and 34) extending upwardly about the periphery of the base frame compress the filter pad (28) against the upper housing to create a substantially fluid-tight seal. Consequently, when the filter pad holder is coupled to the pumping unit, the contaminated fluid is prevented from exiting the chamber without passing through the filter pad. Rather, the contaminated fluid is drawn into the bottom of the chamber through an inlet opening (30) in the base frame, then through the filter pad, and then out the top the chamber through an outlet aperture (50) in the upper housing.

9 Claims, 3 Drawing Sheets

FILTER PAD HOLDER

TECHNICAL FIELD

This invention relates to filter holders and, more specifically, to holders particularly useful in supporting a filter pad used to filter hot cooking oil.

BACKGROUND OF THE INVENTION

Cooking oils, such as those used in commercial or institutional deep fryers, tend to become contaminated with such things as moisture and carbonized food particles during frying. The oils also tend to break down chemically after extended use, often causing the oil to foam, smoke, smell bad, look bad, or taste bad. It has been found that keeping the cooking oil clean by removing the particulate matter and filtering it on a regular basis tends to extend the useful life of the cooking oil, and increase the quality and appearance of foods which are cooked therein.

Accordingly, a variety of specialized systems and filter media for filtering cooking oil have been developed. In most oil filtering systems, the contaminated oil is transferred from the deep fryer to a holding reservoir, pumped under vacuum through a filter medium, and then returned to the deep fryer for further use.

One widely used filter system and medium combination includes a vacuum chamber having a relatively flat upper surface in which a number of holes are formed. A thin piece of filter paper is laid over the upper surface of the vacuum chamber and held in place along its edges by a small number of stays. The vacuum chamber is coupled through an adaptor to the pumping unit of the main filter system. When in use the vacuum chamber, with filter paper intact, is placed at the bottom of the reservoir of contaminated oil. Through the action of the pumping unit, the contaminated oil is drawn through the paper filter, into the vacuum chamber, out through the adaptor, and returned to the deep fryer for reuse.

The vacuum chamber of this filter system has a seam extending around its perimeter where the top half and the bottom half of the chamber are joined. In use, contaminated oil can enter the vacuum chamber through this seam without passing through the paper filter, thereby being returned to the deep fryer in an unfiltered condition. This is particularly true when the upper surface of the paper filter becomes covered with debris, as the oil will naturally seek out a path of lesser resistance.

Additionally, this filter system allows for the passage of contaminated oil into the vacuum chamber around the edges of the filter paper. Because the design of this filter system relies upon the peripherally located stays and the pressure exerted by the vacuum chamber to hold the filter paper in place, a truly tight seal between the upper surface of the vacuum chamber and the filter paper cannot be maintained.

Another drawback of this design is that the holes in the upper surface of the vacuum chamber, through which the contaminated oil must pass, amount to only some fifty percent of the total surface area of the upper surface. Because contaminated oil can only pass through an area of the filter paper having an underlying hole, it is only approximately this same percentage of the filter paper that is utilized.

Another commercially available filter system and medium combination utilizes a vacuum chamber, but does not use a paper filter medium. Rather, a filtering powder (such as magnesium silicate) is added to the contaminated oil in the reservoir. The upper surface of the vacuum chamber contains a very fine mesh through which the contaminated oil is drawn. The filtering powder, which is suspended in the contaminated oil, begins to plate out over the fine mesh as the oil is drawn into the vacuum chamber. When a sufficient layer of filtering powder has so formed, a filter medium is created over the top of the fine mesh.

The disadvantages of this slurry-type filtering design are many. First, in the initial stages of filtering, the contaminated oil is not effectively filtered because a sufficient layer of filtering powder has not yet plated out. Thus, this design requires that the oil be run through two or more cycles in order to be sufficiently filtered. However, the pumping action of such recycling tends to damage the oil due to the oxidation and chemical breakdown of the large carbon chain compounds that make up the oil.

Another disadvantage of this design is that a portion of the filtering powder remains with the filtered oil that is returned for subsequent use, thereby potentially impairing the effectiveness of the filtered cooking oil and/or the taste of foods cooked therein. Additionally, this design requires that the vacuum chamber unit be broken down and the plated out layer of filtering powder be removed after each use.

With each of the two above-described designs, contaminated oil is drawn into the vacuum chamber through the upper surface of the chamber. Consequently, a residual amount of oil lying between the upper surface of the vacuum chamber and the lower surface of the reservoir never gets filtered or returned for subsequent use. This residual layer of oil is known as a "heel."

As a result, there has been a long-felt need for a filter system and medium combination useful in filtering contaminated cooking oil that: (1) is relatively inexpensive to produce; (2) prevents contaminated oil from bypassing the filter medium and being returned for reuse in an unfiltered state; (3) fully utilizes the effective filtering area of the filter medium; (4) sufficiently filters the contaminated oil with a single pass through the combination; (5) causes no excessive damage to the oil during filtering; and (6) leaves no residual heel. This invention, when used in conjunction with various commercially available filter systems and a currently available filter medium, is directed to satisfying this need.

SUMMARY OF THE INVENTION

In accordance with this invention, an improved filter pad holder assembly for supporting a filter pad is disclosed. The filter pad holder assembly is used in conjunction with a filter system having a pumping unit to filter a contaminated fluid. The filter pad holder assembly includes a base frame and an upper housing. The base frame has upwardly projecting filter pad contacting means and an inlet opening through which the contaminated fluid enters. The upper housing has a recess sized to receive the filter pad, and has a filter pad support against which the filter pad is positioned. An outlet aperture, through which the filtered fluid exits after passing through the filter pad, is formed in the upper housing.

Hinge means hingedly couple the base frame and the upper housing to form a chamber when the base frame and upper housing are pivoted to a closed operative position. When the filter pad holder assembly (with filter pad in place) is coupled to the pumping unit, the contaminated fluid is drawn into the bottom of the chamber through the inlet opening in the base frame, then through the filter pad, and then out the top of the chamber through the outlet aperture in the upper housing.

Latch means for maintaining the base frame and upper housing in this closed operative position are provided, such that the filter pad contacting means of the base frame compresses the filter pad against the upper housing to create a substantially fluid-tight seal. As a result, contaminated fluid is prevented from exiting the chamber formed by the base frame and upper housing without passing through the filter pad.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION OF THE PREFERRED EMBODIMENT

Figure 1:
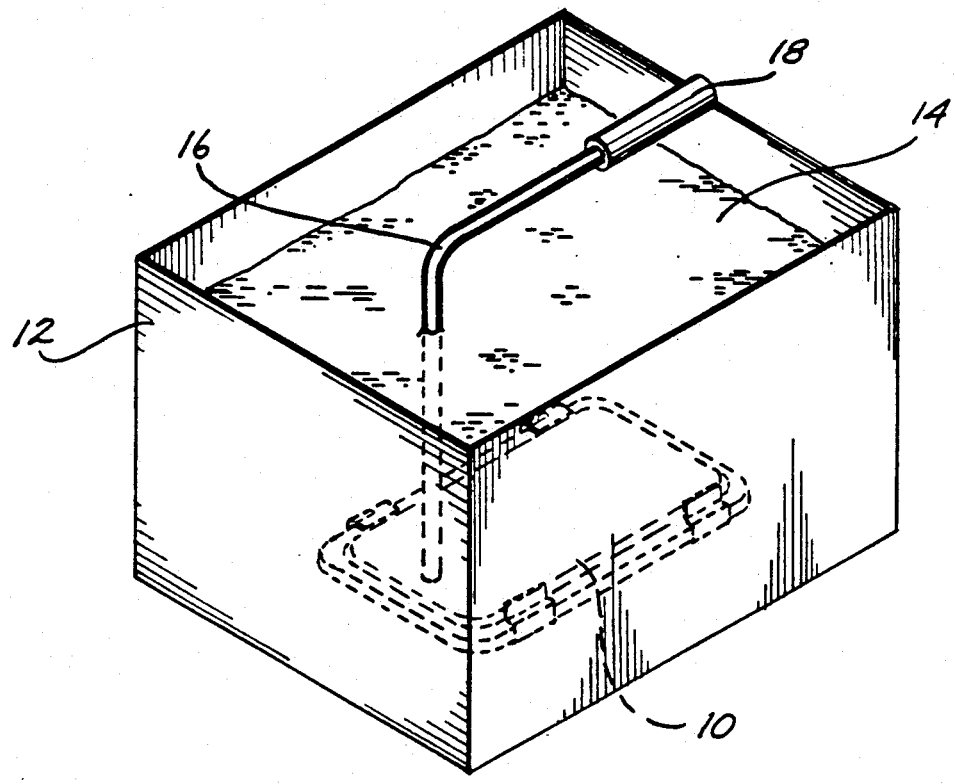
FIG. 1 is an environmental isometric view of a filter system reservoir containing contaminated cooking oil and utilizing a filter pad holder made in accordance with the principles of the present invention.

As illustrated in FIG. 1, a filter pad holder 10 formed in accordance with the present invention may be utilized in conjunction with standard filtering systems to filter contaminated cooking oil. The filter pad holder 10, utilizing an internally disposed filter pad (not shown), is placed in and rests on the typically flat bottom of a reservoir 12 containing the contaminated cooking oil 14 that is to be filtered. The filter pad holder 10 forms a chamber to which a vacuum is applied through an adaptor 16 by the pumping unit (not shown) of the filter system. The adaptor 16 may be of a variety of configurations and materials of construction. Additionally, it has a coupling 18 adapted to fit the particular filter system to which the filter pad holder 10 of the present invention is applied.

Figure 2:
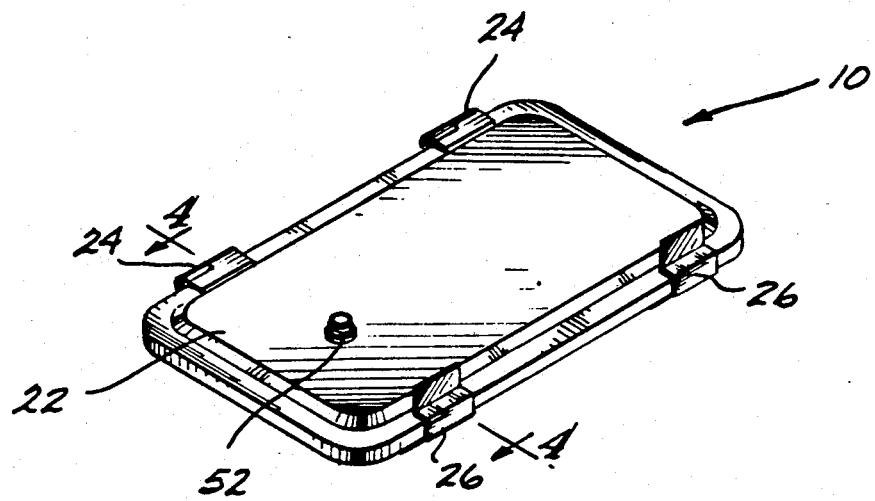
FIG. 2 is an isometric view of the filter pad holder of the present invention isolated from its environment of application.
Figure 3:
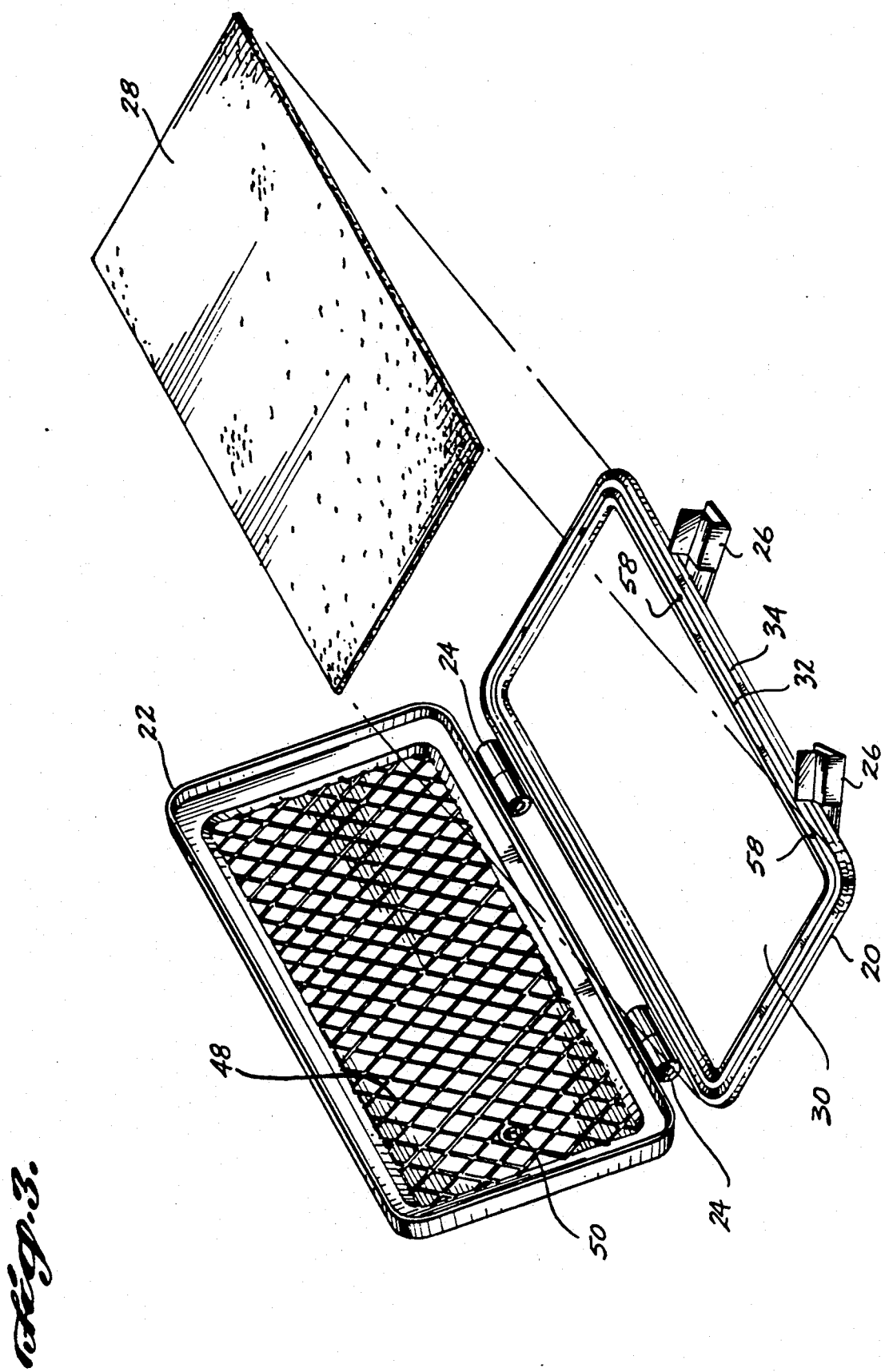
FIG. 3 is an isometric view of the filter pad holder shown in FIG. 2 in its open position, and a corresponding filter pad exploded from its position of application.
Figure 4:
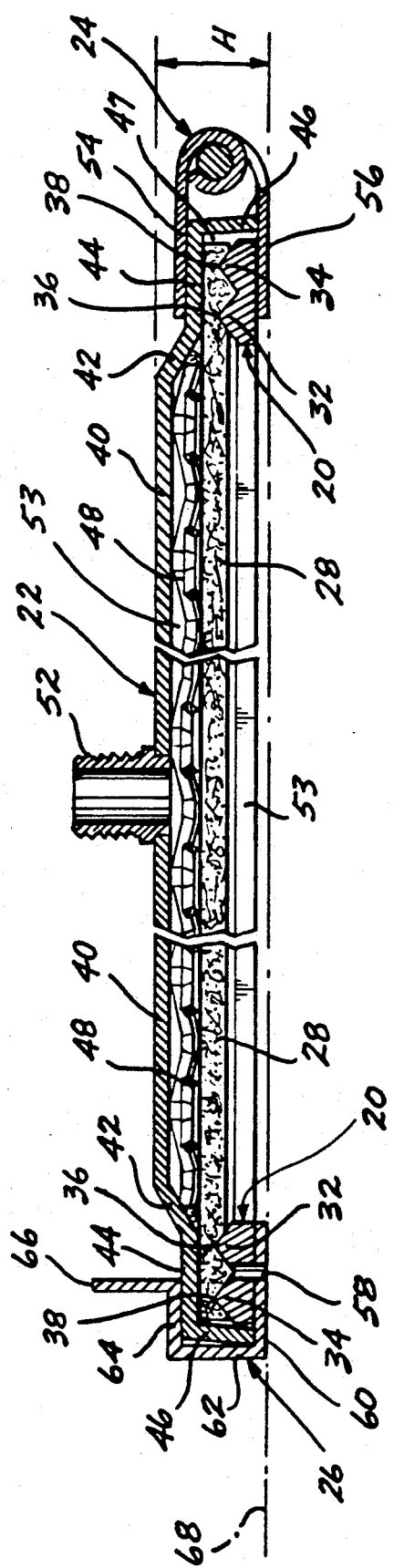
FIG. 4 is a cross-sectional view of the filter pad holder, with filter pad in place, taken along line 4—4 of FIG. 2.

FIGS. 2, 3, and 4 illustrate an embodiment of the filter pad holder 10 generally including a base frame 20, an upper housing 22 coupled to the base frame 20 by a pair of hinges 24, and a pair of latches 26 to hold the filter pad holder in its closed operative position. A filter pad 28 is adapted to be contained within a recess formed in upper housing 22.

The base frame 20 is a thin, substantially rectangular plate having a large inlet opening 30 through which the contaminated cooking oil enters. An inner rib 32 and a spaced-apart outer rib 34 are integral with and extend about the entire periphery of the upper surface of base frame 20 (see FIG. 4). Inner rib 32 projects upwardly from the upper surface of base frame 20 and tapers to an inner filter pad contact edge 36. Similarly, outer rib 34 projects upwardly from the upper surface of base frame 20 and tapers to an outer filter pad contact edge 38. When the filter pad holder 10 is in its closed operative position, and a filter pad 28 is in place, the contact edges 36 and 38 form two peripheral lines of seal which ensure that the contaminated cooking oil passes through, rather than around, the filter pad 28.

The upper housing 22 has a centrally located, flat, horizontally oriented upper surface 40; a peripheral, downwardly sloping angled edge 42 contiguous with upper surface 40; a peripheral, horizontally oriented lower surface 44 contiguous with angled edge 42; and a peripheral, downwardly projecting outer edge 46 contiguous with lower surface 44. As shown in FIG. 4, the upper housing 22 forms a recess 47 sized to receive the filter pad 28. When the filter pad holder 10 of the present invention is in its closed operative position, the filter pad 28 is gripped between the bottom of lower surface 44 and the inner and outer ribs 32 and 34 of base frame 20.

As illustrated in FIG. 4, the angle between the bottom of lower surface 44 and the inside of outer edge 46 is greater than ninety degrees. This allows the upper housing 22 to be manufactured with a stamp press rather than a brake press. As is well known in the art, a stamp press has difficulty in forming sharp, ninety degree edges. Additionally, FIGS. 2 and 3 show the corners of upper housing 22 to be radiused, as required for stamp press manufacture. For conformance, the corners of the base frame 20 are similarly radiused. Stamp pressing allows the upper housing 22 to be manufactured at a cost significantly below that possible with brake press manufacturing.

A filter pad support 48 is peripherally mounted to the upper housing 22 at locations along the angled edge 42 of the housing (see FIGS. 3 and 4). Preferably, the filter pad support 48 is welded to angled edge 42. The filter pad support 48 is an expanded metal matrix, with each matrix member having a substantially parallelogram-shaped cross section (see FIG. 4). Thus, the filter pad support 48 provides a support surface for the top of filter pad 28 in the central region of upper housing 22, while at the same time contacting only a minuscule portion of the surface area on the upper surface of the filter pad. Given this minimal area of contact, virtually no impedance is provided to the free flow of contaminated fluid through the filter pad.

Because the expanded metal that makes up filter pad support 48 is currently only commercially available in mild steel composition, the material of composition for upper housing 22 must also be steel to allow the filter pad support 48 to be properly welded in place. In order to resist corrosion, stainless steel is the preferable material of composition for upper housing 22. In contrast, the base frame 20 need not be steel, and may be composed of cast aluminum to help reduce the overall weight of the filter pad holder 10.

The inner peripheral dimension of the outer edge 46 of upper housing 22 only slightly exceeds the outer peripheral dimension of base frame 20, so that a relatively snug fit exists between the housing and base frame when the filter pad holder 10 is in its closed operative position shown in FIG. 4. However, the fit is not so snug as to interfere with the operation of the hinges 24.

An outlet aperture 50, through which the filtered cooking oil exits, is formed in the upper surface 40 of the upper housing 22. While this aperture 50 has been illustrated as lying near one end of upper surface 40, it may have any location necessary to fit the particular filter system of application. Preferably, a coupling 52 extending upwardly from upper housing 22 is mounted within the outlet aperture 50. The coupling is configured to be capable of attachment to the adaptor 16, which is in turn connected to the pumping unit of the filter system of application. In this way, the vacuum necessary to draw the contaminated cooking oil through the filter pad 28 and out the outlet aperture 50 is provided.

The spaced-apart hinges 24 hingedly couple the base frame 20 to the upper housing 22 such that a chamber 53 is formed when the base frame and housing are pivoted to their closed operative position (shown in FIG. 4). Each hinge has a first hinge plate 54 attached to the top of the horizontally oriented lower surface 44 of upper housing 22, and a second hinge plate 56 attached to the bottom surface of the base frame 20. Preferably, the hinges 24 are composed of stainless steel. Given the preferred materials of composition mentioned earlier for the upper housing 22 and base frame 20, it is advantageous that the first hinge plate 54 be welded in position, and that the second hinge plate 56 be attached by rivets (not shown).

Each of the spaced-apart latches 26 is rotatably mounted to the bottom surface of the base frame 20 by a rivet 58 (see FIG. 4). Each latch 26 has a flat, horizontally oriented lower surface 60 through which the rivet 58 extends, and an upwardly extending outer edge 62 contiguous with and formed substantially orthogonal to lower surface 60. A horizontally oriented upper surface 64 is contiguous with outer edge 62 and extends in a direction toward the center region of the filter pad holder 10, terminating at a position corresponding to the approximate midpoint of the lower surface 44 of upper housing 22. An upwardly extending ear 66 is contiguous with the terminus of upper surface 64, and is oriented substantially orthogonal to the upper surface 64. As shown in FIG. 4, outer edge 62 is of a length such that the contact edges 36 and 38 of base frame 20 compress the filter pad 28 to create a substantially fluid-tight seal at the junction of the base frame 20 and the upper housing 22 when the filter pad holder 10 is held in a closed operative position by latches 26.

Referring to FIG. 4, the second hinge plate 56 of hinge 24 and the lower surface 60 of latch 26 are shown to rest upon the substantially flat bottom surface 68 of the reservoir 12, and thus act as spacers between the bottom of base frame 20 and the bottom surface of the reservoir. Accordingly, it is preferable that the thickness of second hinge plate 56 and the thickness of lower surface 60 be substantially identical. A thickness of 0.060 inches has been found to provide a satisfactory space. Given this configuration, the base frame 20 is elevated above the bottom surface 68 of the reservoir 12, thereby allowing free flow of the contaminated cooking oil into the bottom of the chamber 53 of filter pad holder 10 and then through the filter pad 28.

Given that the contaminated cooking oil is drawn into the chamber 53 from the bottom, it will be appreciated that, when a sufficient vacuum is applied, the filter pad holder 10 of the present invention leaves essentially no heel of residual contaminated oil in the reservoir. In marked contrast, a heel corresponding to the depth indicated by the letter H in FIG. 4 would likely be left with the currently available filtering systems described above in the Background of the Invention section.

The filter pad 28 that is used in conjunction with the filter pad holder 10 of the present invention should have the desired filtering properties and be of a peripheral dimension substantially matching that of the base frame 20. It should also have a thickness and a compressibility necessary to form the required fluid-tight seal at contact edges 36 and 38 of base frame 20 when the filter pad holder 10 is in its closed operative position (shown in FIG. 4). One such filter pad is commercially sold under the trademark SUPERSORB (Product No. F-15) by Filtercorp, Inc. of Woodinville, Wash.

While a preferred embodiment of the present invention has been illustrated and described, it should be understood that variations could be made therein without departing from the scope of the invention. For instance, the filter pad holder of the present invention could be utilized in a closed-to-atmosphere filter system operating under positive pressure, rather than in the open-to-atmosphere filter system operating under vacuum described above. Further, the filter pad holder may be used in conjunction with filter pads of various composition to filter fluids other than contaminated cooking oil. Accordingly, it is to be understood that the invention is not to be limited to the specific embodiment illustrated and described. Rather, the true scope of the invention is to be determined by reference to the following claims.

The embodiments of the invention in which an exclusive property or privilege is claimed are defined as follows:

1. A filter pad holder assembly for supporting a filter pad used in conjunction with a pumping unit to filter a contaminated fluid, the filter pad holder assembly comprising:

a base frame having upwardly projecting filter pad contacting means and an inlet opening through which the contaminated fluid enters;

an upper housing having a recess sized to receive the filter pad, said upper housing having a filter pad support against which the filter pad is positioned, said upper housing further having an outlet aperture through which the filtered fluid exits after passing through the filter pad;

hinge means for hingedly coupling said base frame to said upper housing such that a chamber is formed when said base frame and said upper housing are pivoted to a closed operative position, the contaminated fluid being drawn into the bottom of said chamber through said inlet opening of said base frame, through the filter pad, and out the top of said chamber through said outlet aperture of said upper housing by the action of the pumping unit; and latch means for maintaining said base frame and said upper housing in said closed operative position such that said filter pad contacting means of said base frame compresses the filter pad against said upper housing to create a substantially fluid-tight seal, thereby preventing contaminated fluid from exiting said chamber through said outlet aperture without passing through the filter pad, wherein said hinge means and said latch means constitute spacer means holding said base frame above the surface upon which the filter pad holder assembly rests, thereby allowing the unrestricted flow of contaminated fluid into said chamber through said inlet opening of said base frame.

2. The filter pad holder assembly of claim 1, wherein said spacer means hold said base frame approximately 0.060 inches above the surface upon which the filter pad holder assembly rests.

3. The filter pad holder assembly of claim 1, wherein said hinge means comprises a pair of spaced-apart hinges, each hinge having a first hinge plate attached to said upper housing and a second hinge plate attached to said base frame.

4. The filter pad holder assembly of claim 1, wherein said latch means comprises a pair of spaced-apart latches rotatably mounted to said base frame and configured to engage said upper housing, each latch having an upwardly extending ear to facilitate movement of said latch into and out of engagement with said upper housing.

5. The filter pad holder assembly of claim 1, wherein said filter pad contacting means comprises a pair of spaced-apart ribs integral with and extending about the entire periphery of said base frame, each of said ribs projecting upwardly from said base frame and tapering from said base frame to a filter pad contact edge.

6. The filter pad holder assembly of claim 1, wherein said filter pad support comprises a structural matrix mounted to said upper housing between said outlet aperture and the filter pad, said matrix being configured to have only minimal contact with the upper surface of the filter pad so as to fully utilize the effective filtering area of the filter pad.

7. The filter pad holder assembly of claim 1, further comprising a coupling mounted within and extending upwardly from said outlet aperture of said upper housing, said coupling being capable of attachment to an adapter which connects the filter pad holder assembly to the pumping unit.

8. A filter pad holder assembly for supporting a filter pad used in conjunction with a pumping unit to filter a contaminated fluid, the filter pad holder assembly comprising:
- a base frame having upwardly projecting filter pad contacting means and an inlet opening through which the contaminated fluid enters;
- a filter pad;
- an upper housing having a recess sized to receive said filter pad, said upper housing having a filter pad support against which said filter pad is positioned, said upper housing further having an outlet aperture through which the filtered fluid exists after passing through said filter pad;
- hinge means for hingedly coupling said base frame to said upper housing such that a chamber is formed when said base frame and said upper housing are pivoted to a closed operative position, the contaminated fluid being drawn into the bottom of said chamber through said inlet opening of said base frame, through said filter pad, and out the top of said chamber through said outlet aperture of said upper housing by the action of the pumping unit; and
- latch means for maintaining said base frame and said upper housing in said closed operative position such that said filter pad contacting means of said base frame compresses said filter pad against said upper housing to create a substantially fluid-tight seal, thereby preventing contaminated fluid from exiting said chamber through said outlet aperture without passing through said filter pad,
- wherein said hinge means and said latch means constitute spacer means holding said base frame above the surface upon which the filter pad holder assembly rests, thereby allowing the unrestricted flow of contaminated fluid into said chamber through said inlet opening of said base frame.

9. A filter pad holder assembly for supporting a filter pad used in conjunction with a pumping unit to filter a contaminated cooking oil, the filter pad holder assembly comprising:
- a base frame having upwardly projecting filter pad contacting means and an inlet opening through which the contaminated cooking oil enters;
- an upper housing having a recess sized to receive the filter pad, said upper housing having a filter pad support against which the filter pad is positioned, said upper housing further having an outlet aperture through which the filtered cooking oil exits after passing through the filter pad;
- hinge means for hingedly coupling said base frame to said upper housing such that a chamber is formed when said base frame and said upper housing are pivoted to a closed operative position, the contaminated cooking oil being drawn into the bottom of said chamber through said inlet opening of said base frame, through the filter pad, and out the top of said chamber through said outlet aperture of said upper housing by the action of the pumping unit; and
- latch means for maintaining said base frame and said upper housing in said closed operative position such that said filter pad contacting means of said base frame compresses the filter pad against said upper housing to create a substantially fluid-tight seal, thereby preventing contaminated cooking oil from exiting said chamber through said outlet aperture without passing through the filter pad,
- wherein said hinge means and said latch means constitute spacer means holding said base frame above the surface upon which the filter pad holder assembly rests, thereby allowing the unrestricted flow of contaminated cooking oil into said chamber through said inlet opening of said base frame.

* * * * *